(12) United States Patent
Minelly et al.

(10) Patent No.: US 7,400,807 B2
(45) Date of Patent: Jul. 15, 2008

(54) APPARATUS AND METHOD FOR A WAVEGUIDE WITH AN INDEX PROFILE MANIFESTING A CENTRAL DIP FOR BETTER ENERGY EXTRACTION

(75) Inventors: John D. Minelly, Bothell, WA (US); Matthias P. Savage-Leuchs, Woodinville, DE (US); Barton J. Jenson, Bothell, WA (US); Jason D. Henrie, Snowhomish, WA (US); Eric C. Eisenberg, Shoreline, WA (US)

(73) Assignee: Aculight Corporation, Bothell, WA (US)

( * ) Notice: Subject to any disclaimer, the term of this patent is extended or adjusted under 35 U.S.C. 154(b) by 0 days.

(21) Appl. No.: 11/556,658

(22) Filed: Nov. 3, 2006

(65) Prior Publication Data

US 2007/0206912 A1    Sep. 6, 2007

Related U.S. Application Data

(60) Provisional application No. 60/733,977, filed on Nov. 3, 2005.

(51) Int. Cl.
*G02B 6/02* (2006.01)
*G02B 6/18* (2006.01)
*H01S 3/00* (2006.01)
*H04B 10/12* (2006.01)

(52) U.S. Cl. .................. 385/124; 385/123; 385/126; 385/127; 385/128; 385/141; 385/142; 359/341.1; 359/341.3; 359/341.5; 359/342; 359/343; 359/344

(58) Field of Classification Search ............... 385/124; 359/341.1, 341.5
See application file for complete search history.

(56) References Cited

U.S. PATENT DOCUMENTS

| | | | |
|---|---|---|---|
| 4,009,014 A | 2/1977 | Black et al. |
| 4,372,648 A | 2/1983 | Black |
| 4,447,124 A | 5/1984 | Cohen |

(Continued)

OTHER PUBLICATIONS

Adams, M. J., et al., Wavelength-Dispersive Properties of Glasses for Optical Fibres: the Germania Enigma, Electronic Letters, Oct. 26, 1978, two pages reprinted from pp. 703-705, vol. 14, No. 22.

(Continued)

*Primary Examiner*—Frank G Font
*Assistant Examiner*—Ryan Lepisto
(74) *Attorney, Agent, or Firm*—Charles A. Lemaire; Lemaire Patent Law Firm, P.L.L.C.

(57) ABSTRACT

A method and apparatus is described that use an index-of-refraction profile having a significant central dip in refractive index (or another tailored index profile) within the core of a gain fiber or a gain waveguide on a substrate. The benefits of this central dip (more power with a given mode structure) are apparent when an input beam is akin to that of a Gaussian mode. In some embodiments, the invention provides a fiber or a substrate waveguide having an index profile with a central dip, but wherein the device has no doping. Some embodiments use a central dip surrounded by a higher-index ring in the index of refraction of the core of the fiber, while other embodiments use a trench between an intermediate-index central core portion and the ring, or use a plurality of rings and/or trenches. Some embodiments use an absorber in at least one core ring.

34 Claims, 11 Drawing Sheets

U.S. PATENT DOCUMENTS

| | | | |
|---|---|---|---|
| 4,723,828 | A | 2/1988 | Garel-Jones et al. |
| 5,121,460 | A | 6/1992 | Tumminelli et al. |
| 5,261,016 | A | 11/1993 | Poole |
| 5,361,319 | A | 11/1994 | Antos et al. |
| 5,790,735 | A | 8/1998 | Oleskevich et al. |
| 5,818,630 | A | 10/1998 | Fermann et al. |
| 5,828,802 | A | 10/1998 | Stolen et al. |
| 5,926,600 | A | 7/1999 | Pavlath |
| 6,327,403 | B1 | 12/2001 | Danziger et al. |
| 6,434,311 | B1 | 8/2002 | Danziger et al. |
| 6,463,201 | B2 | 10/2002 | Aiso et al. |
| 6,496,301 | B1 | 12/2002 | Koplow et al. |
| 6,574,406 | B2 | 6/2003 | Ainslie et al. |
| 6,603,791 | B2 | 8/2003 | Goldberg et al. |
| 6,614,975 | B2 * | 9/2003 | Richardson et al. ......... 385/127 |
| 6,625,354 | B2 | 9/2003 | Hollister et al. |
| 6,640,031 | B2 | 10/2003 | Dong et al. |
| 6,711,918 | B1 | 3/2004 | Kliner et al. |
| 6,731,837 | B2 | 5/2004 | Goldberg et al. |
| 6,771,414 | B2 | 8/2004 | Masuda et al. |
| 6,778,782 | B1 | 8/2004 | Watley et al. |
| 6,825,974 | B2 | 11/2004 | Kliner et al. |
| 6,836,607 | B2 | 12/2004 | Dejneka et al. |
| 6,959,022 | B2 | 10/2005 | Sandrock et al. |
| 6,985,660 | B2 | 1/2006 | Koshiba et al. |
| 2003/0002834 | A1 | 1/2003 | Brown et al. |

OTHER PUBLICATIONS

Davis, Christopher C., Lasers and Electro-optics Fundamentals and Engineering, Chapter 17, pp. 387-437, 1996, Publisher: Cambridge University Press.

Gloge, D., et al., GaAs Twin-Laser Setup to Measure Mode and Material Dispersion in Optical Fibers, Applied Optics, Feb. 1974, pp. 261-263, vol. 13, No. 2.

Lushnikov, P.M., Dispersion-Managed Soliton in Optical Fibers with Zero Average Dispersion, Optics Letters, Aug. 15, 2000, pp. 1144-1146, vol. 25, No. 16.

Luther-Davies B., et al., Evaluation of Material Dispersion in Low Loss Phosphosilicate Core Optical Fibres, Optics Communications, Jan. 1975, pp. 84-88, vol. 13, No. 1.

Minelly, J.D., et al., Efficient Cladding Pumping of an Er3+ Fibre, Proc. 21st Eur. Conf. on Opt. Comm, ECOC 1995, (four pages).

Payne, D. N., et al., Zero Material Dispersion in Optical Fibres, Electronics Letters, Apr. 17, 1975, vol. 11, No. 8 (two pages).

Peddanarappagari, K. V., et al., Study of Fiber Nonlinearities in Communication Systems Using a Volterra Series Transfer Function Approach, Proceedings of the 31st Annual Conference on Information Sciences and Systems (CISS), Mar. 1997 (six pages).

Peddanarappagari, K. V., et al., Design of Fiber Amplifier Based Communications Systems Using a Volterra Series Approach, Proceedings of the 10th Annual Meeting of the IEEE Lasers and Electro-Optics Society (LEOS), Nov. 1997, pp. 228-229, vol. 1.

Wang, Zi Hua, et al., Analysis of the Absorption Efficiency of Graded-Index Double-Clad Fiber, Proceedings of SPIE, 2005, pp. 821-829, vol. 5623.

* cited by examiner

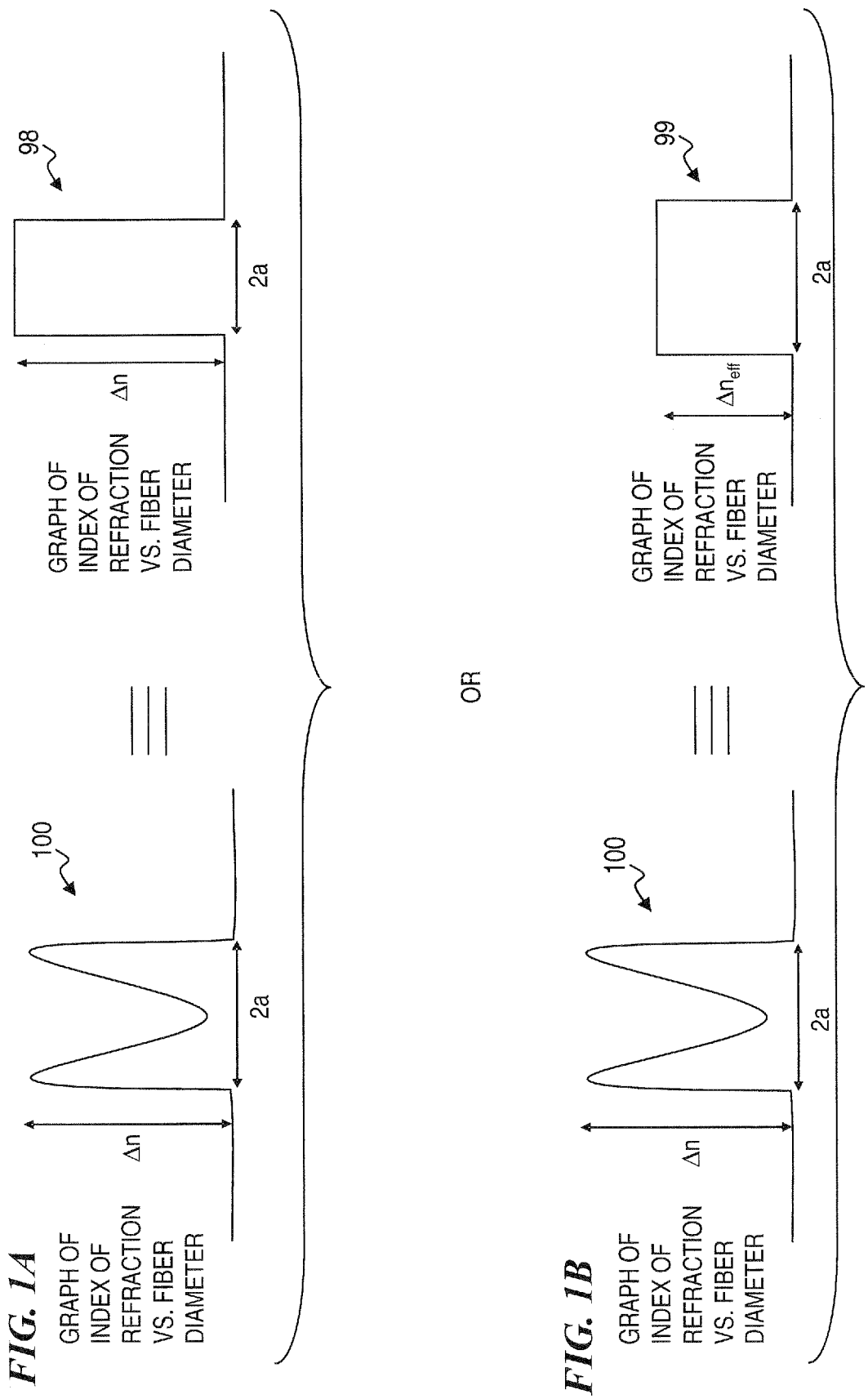

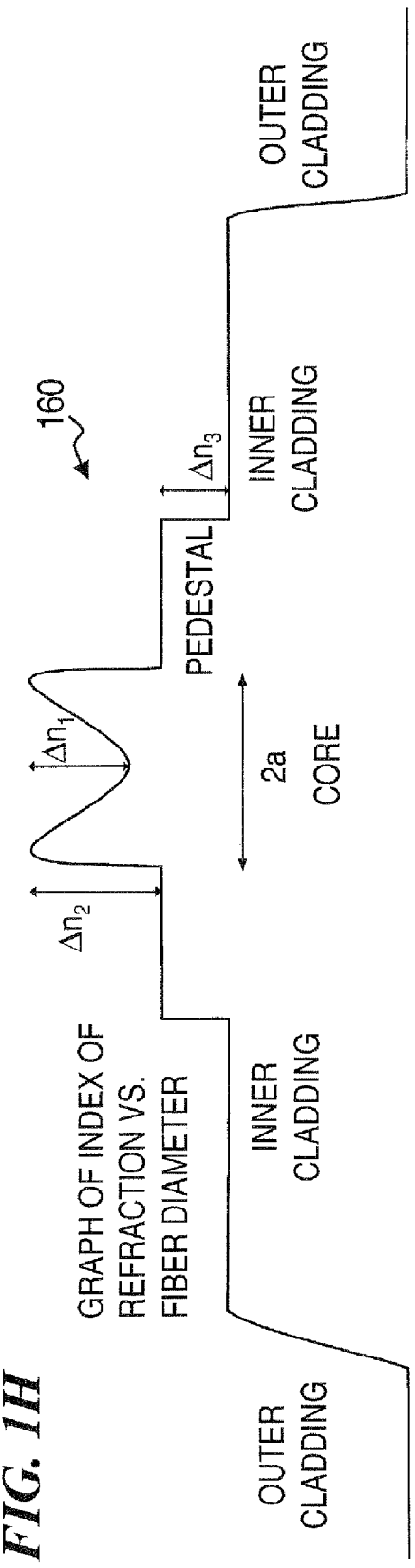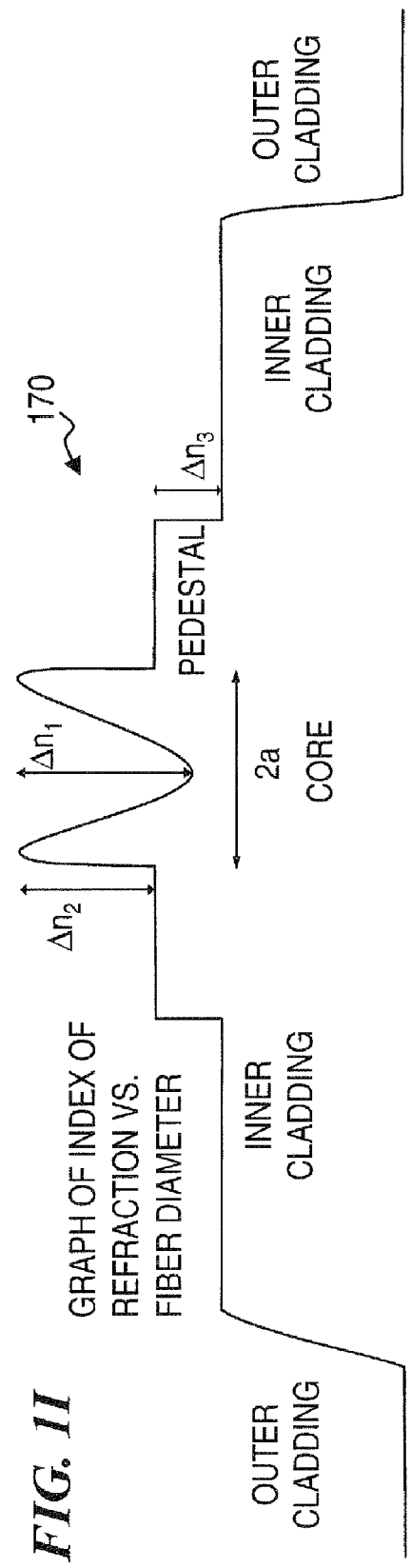

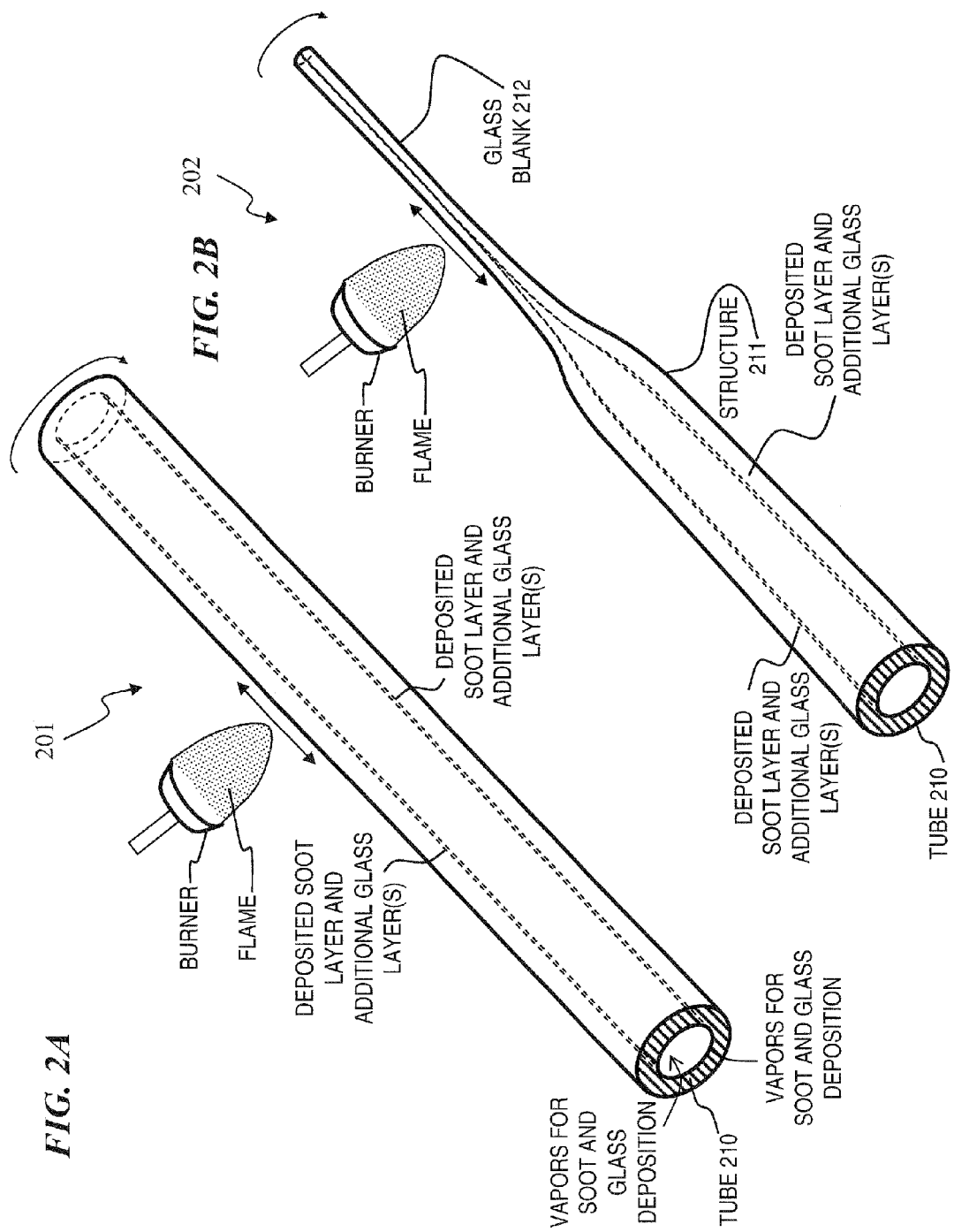

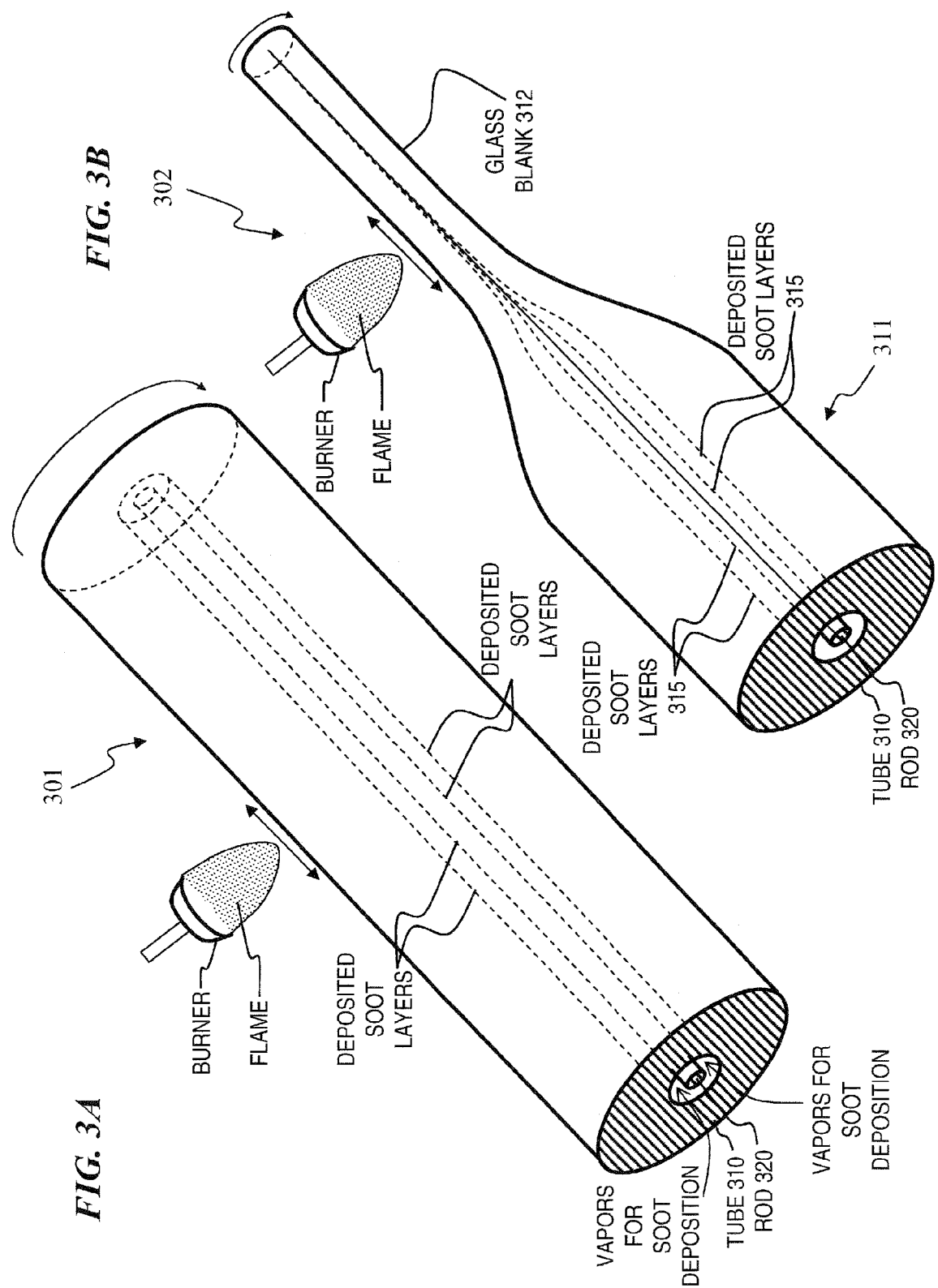

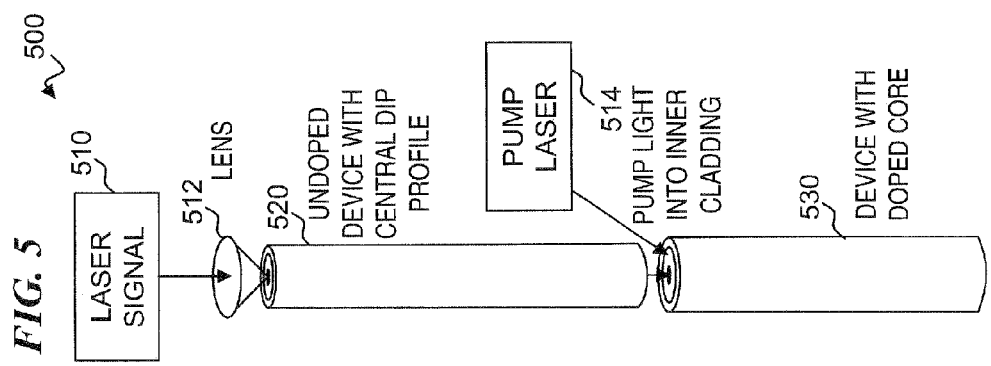
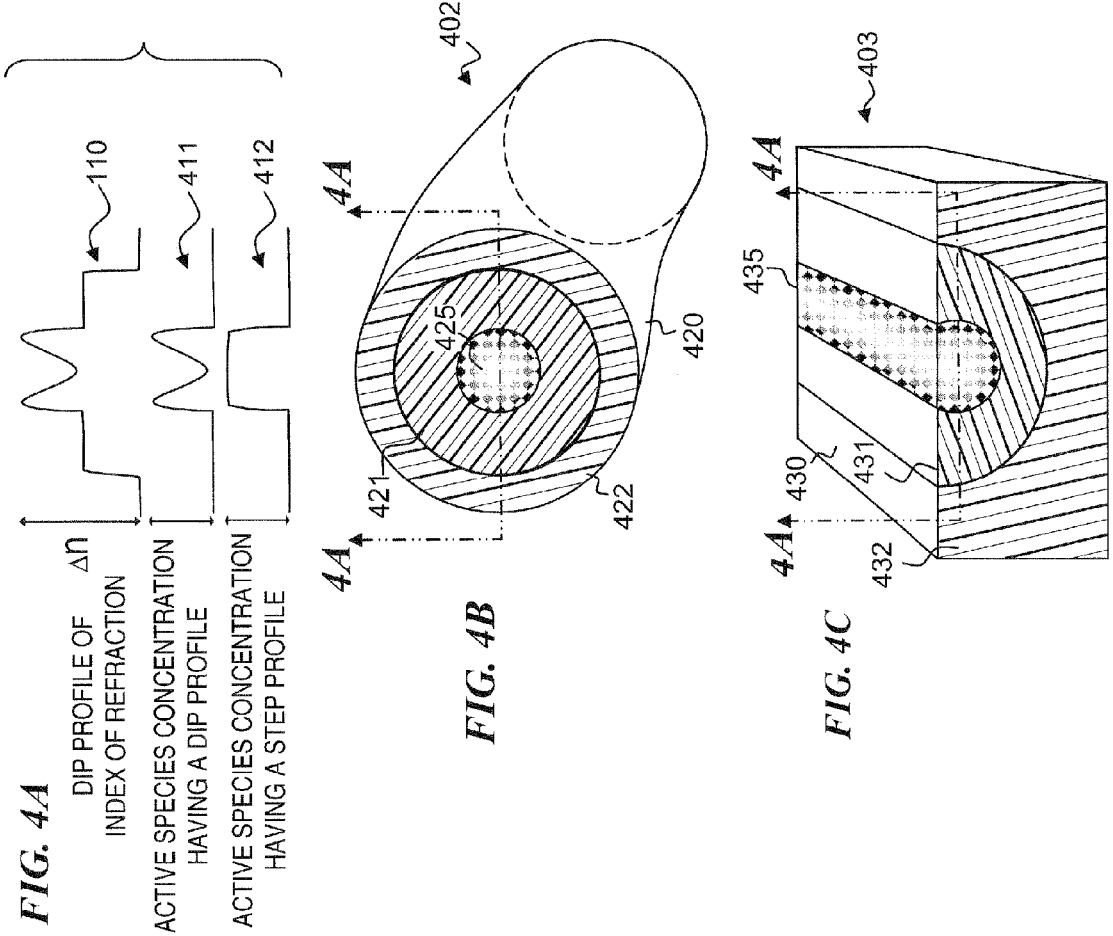

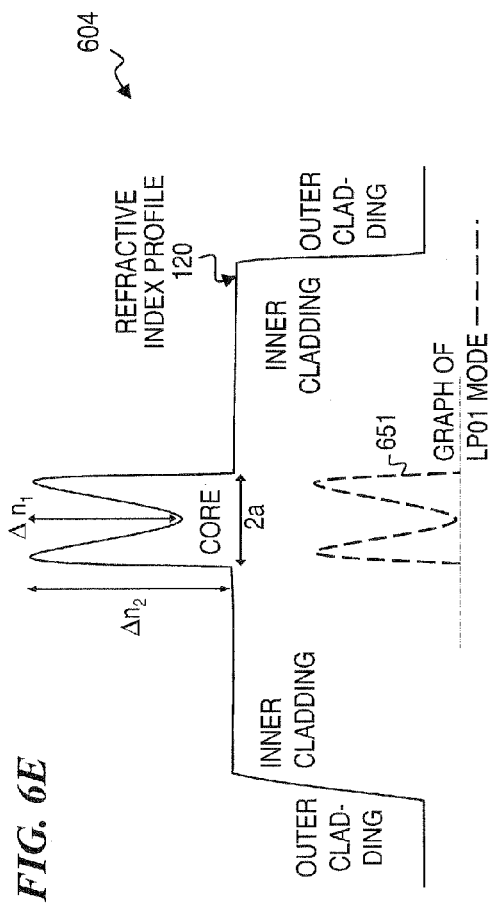
FIG. 6E
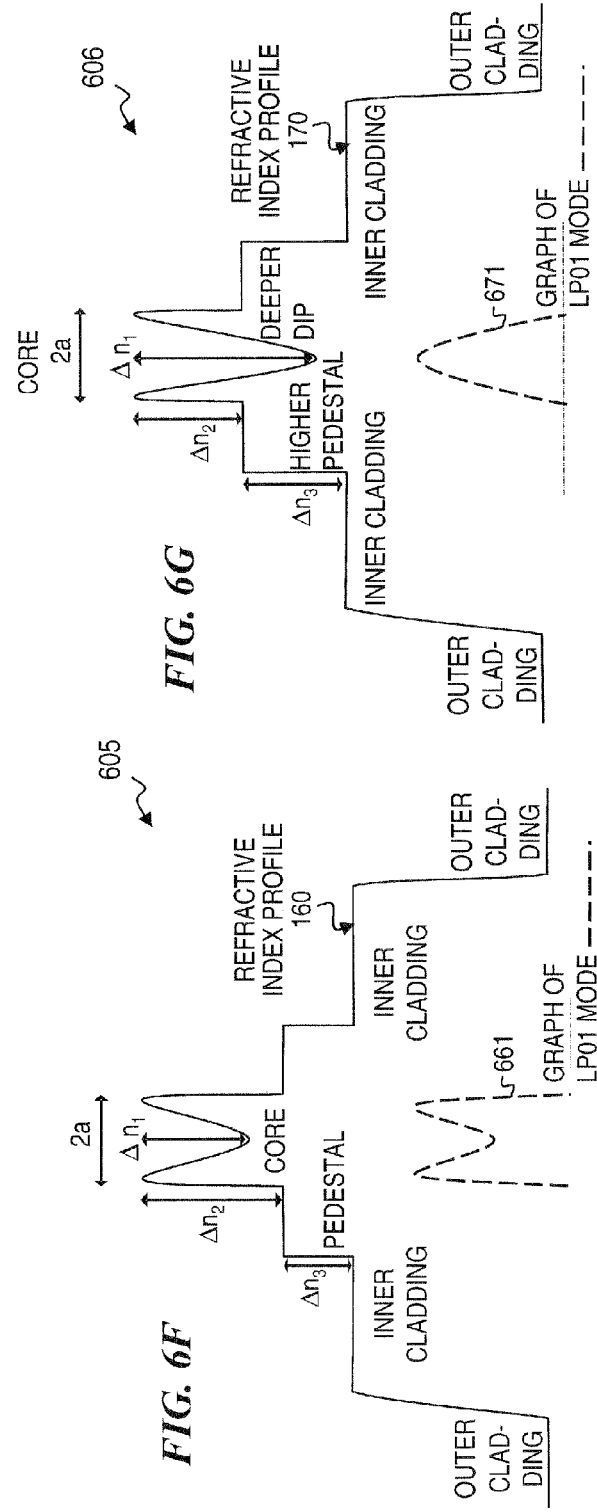
FIG. 6F
FIG. 6G

APPARATUS AND METHOD FOR A WAVEGUIDE WITH AN INDEX PROFILE MANIFESTING A CENTRAL DIP FOR BETTER ENERGY EXTRACTION

CROSS-REFERENCE TO RELATED APPLICATION

This application claims benefit of U.S. Provisional Patent Application No. 60/733,977 filed on Nov. 3, 2005, titled "APPARATUS AND METHOD FOR A WAVEGUIDE WITH AN INDEX PROFILE MANIFESTING A CENTRAL DIP FOR BETTER ENERGY EXTRACTION," which is incorporated herein by reference in its entirety.

FIELD OF THE INVENTION

The invention relates to fiber lasers and amplifiers, and more particularly to optical fiber gain media having a central dip or reduction in index of refraction and/or doping concentration of the active laser species such as erbium and./or ytterbium, in order to provide higher optical-power output.

BACKGROUND OF THE INVENTION

Fiber lasers are typically lasers with optical fibers as gain media, although some lasers with a semiconductor gain medium and a fiber cavity have also been called fiber lasers. In most cases, the gain medium is a fiber doped with rare-earth ions such as erbium, neodymium, ytterbium, or thulium, and one or several laser diodes are used for pumping. Some benefits associated with fiber lasers include: a large gain bandwidth due to strongly broadened laser transitions in glasses, enabling wide wavelength tuning ranges and/or the generation of ultra-short pulses, the potential for very high output powers (e.g., several kilowatts with double-clad fibers) due to a high surface-to-volume ratio (avoiding excessive heating) and the guiding effect, which avoids thermo-optical problems even under conditions of significant heating just to name a few.

Additional benefits can accrue in fiber lasers that have a modified gain medium or, in the case of a fiber laser, a modified gain fiber. As disclosed above, fiber lasers often contain certain glasses such as silica or silica doped with germanium, or crystals such as Nd:YAG (i.e., neodymium-doped yttrium aluminum garnet), Yb:YAG (i.e., yttrium-doped YAG), Yb:glass, or Ti:sapphire, in the form of solid pieces or optical glass fibers. These fibers are doped with some active stimulated-emission ions (also called amplifying or laser ions), that in most cases are trivalent rare-earth ions, and which are optically pumped. The doping density of crystals and glasses often has to be carefully optimized. A high doping density may be desirable for good pump absorption in a short length, but may lead to energy losses related to quenching processes, (e.g. caused by clustering of laser-active ions and energy transport to defects).

In addition to doping the density of a gain fiber, additional energy can be generated by addressing issues related to the refractive index of the core and the cladding material. More to the point, the energy generated by a fiber laser is also dependent upon the various refractive and modal index values associated with a particular gain-fiber configuration. In some configurations, a gain fiber will be configured such that its refractive index is a step index value. The step index fiber is the simplest case of a standard gain fiber.

Despite the benefits associated with fiber lasers, there are problems associated with these types of lasers. For example, complicated temperature-dependent polarization evolution, the various nonlinear effects of which often limit the performance, and risk of fiber damage at high powers (commonly known as "fiber fuse"). When fiber fuse occurs, the fiber can burn down starting from the output end and propagating back towards the input end.

The problems of temperature-dependent polarization and fiber fuse become even more acute, given the current and proposed uses of fiber lasers. As described above, fiber lasers can be used to produce very high output powers. Given these high output powers, fiber lasers have uses for military and industrial applications requiring large amounts of energy. Accordingly, it is necessary to develop methods and apparatus to enable high energy to be used in conjunction with fiber lasers, while at the same time avoiding the aforementioned problems of, for example, fiber fuse.

SUMMARY OF THE INVENTION

In some embodiments, the present invention utilizes a gain medium in the form of a gain fiber that has a refractive index with a significant central dip. The benefits of this central dip are apparent when an input beam is akin to that of a Gaussian mode. In some embodiments, the core is of a relatively large diameter (e.g., 20 microns or more), and the mode (i.e., the primary mode) of the signal has a relatively large cross-sectional area (LMA or large mode area) in the large core. In some embodiments, a linear-polarization-02 (LP02) mode is used such that the primary mode fills the relatively large core and extracts as much energy as possible into the primary mode from the active species, thus leaving little energy left for possible amplification on other modes.

In some embodiments, the refractive index and the concentration of lasing species (e.g., erbium and ytterbium) both increase at the periphery of the core and dip in the center of the core. In some embodiments, an outer cladding of lower index of refraction is provided, in order that pump light introduced into the inner cladding is kept inside the outer cladding, but is allowed into the core in order to pump lasing and/or amplification of a signal wavelength.

BRIEF DESCRIPTION OF THE FIGURES

FIG. 1A are schematic graphs 100 and 98 comparing the index of refraction across a diameter of a fiber according to the present invention to that of a conventional fiber having a step index of the same magnitude but having a smaller core diameter.

FIG. 1B are schematic graphs 100 and 99 comparing the index of refraction across a diameter of a fiber according to the present invention to that of a conventional fiber having a core diameter of the same size but having a step index of a smaller magnitude.

FIG. 1H is a schematic graph 160 of the index of refraction (vertical axis) across a diameter (horizontal axis) of a fiber according to the present invention with a pedestal of raised index of refraction in the inner cladding adjacent to the core.

FIG. 1I is a schematic graph 170 of the index of refraction (vertical axis) across a diameter (horizontal axis) of a fiber according to the present invention with a pedestal of raised index of refraction in the inner cladding adjacent to the core. In this case the minimum in the index near the center of the core falls below the index of the pedestal in the inner cladding.

FIG. 2A is a perspective schematic diagram of an operation 201 in the making of a fiber according to the present invention.

FIG. 2B is a perspective schematic diagram of an operation 202 in the making of a fiber according to the present invention.

FIG. 3A is a perspective schematic diagram of an operation 301 in the making of a fiber according to the present invention.

FIG. 3B is a perspective schematic diagram of an operation 302 in the making of a fiber according to the present invention.

FIG. 4A is a schematic graph 110 of the index of refraction across a diameter 4A of a fiber 402 according to the present invention that also has an outer cladding of a lower index of refraction.

FIG. 4B is a perspective schematic diagram partially in cross-section of fiber 402 having a core with a central dip according to some embodiments of the present invention.

FIG. 4C is a perspective schematic diagram partially in cross-section of a central-dip-waveguide core within a larger slab, rod, or chip-type substrate waveguide optical device 403 according to some embodiments of the present invention.

FIG. 5 is a perspective schematic diagram of a device 500 using components according to the present invention.

FIG. 6E is a schematic graph showing the index of refraction profile 120 of a profile including a central dip. Also shown is a typical mode profile of the LP01 mode FIG. 6F is a schematic graph showing the index of refraction of a profile 160 including a central dip and a raised pedestal surrounding the core. Also shown is a reduction in the magnitude of the central dip.

FIG. 6G is a schematic graph showing the index of refraction of a profile 170 including a more pronounced central dip and a higher pedestal. Also shown is a near-Gaussian profile.

DETAILED DESCRIPTION

Figures 1C, 1D, 1E:
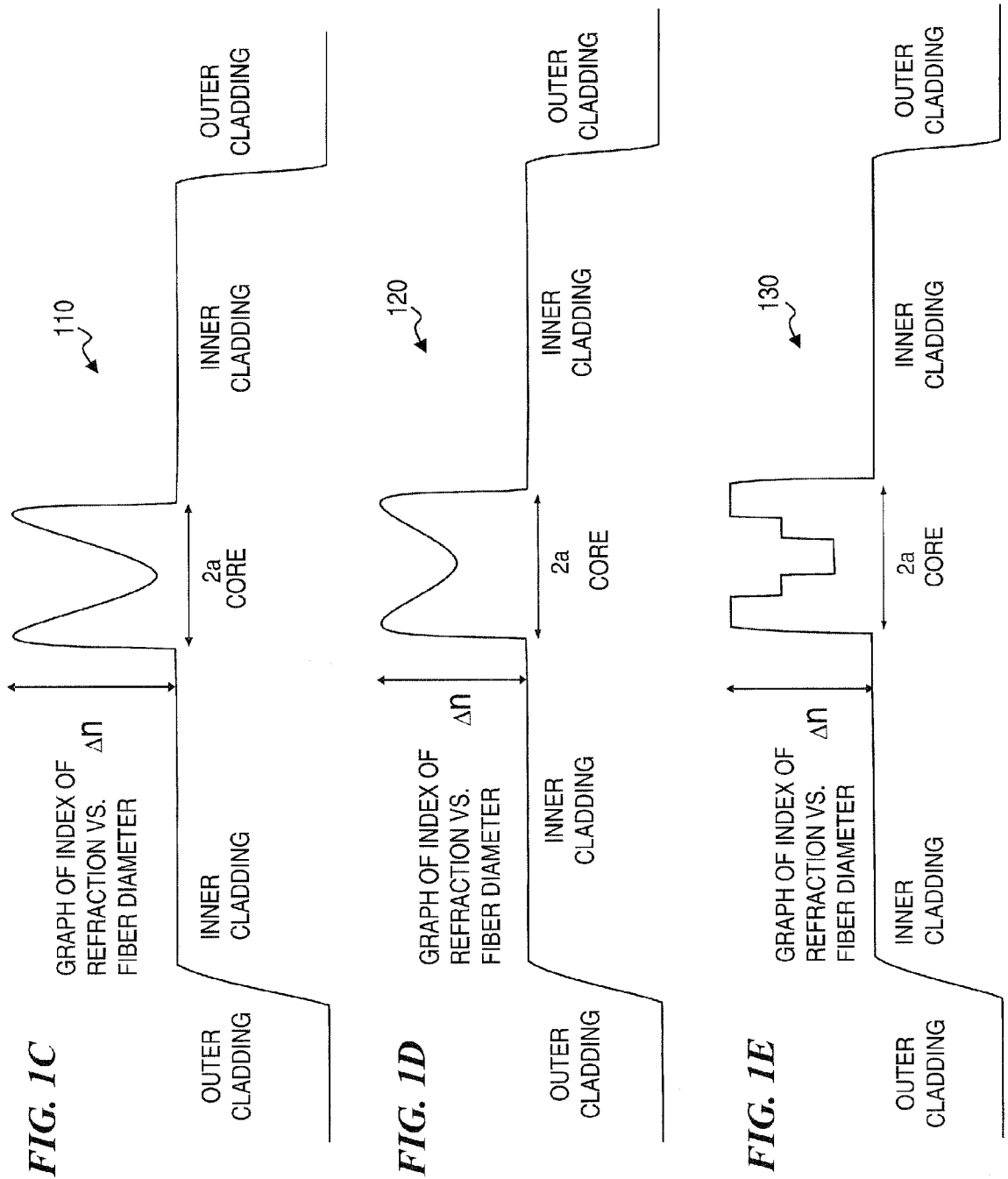
FIG. 1C is a schematic graph 110 of the index of refraction across a diameter of a fiber according to the present invention that also has an outer cladding of a lower index of refraction.
FIG. 1D is a schematic graph 120 of the index of refraction across a diameter of a fiber according to the present invention with a smaller central dip than that of FIG. 1C.
FIG. 1E is a schematic graph 130 of the index of refraction across a diameter of a fiber according to the present invention with a stepped central dip.

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As used herein, the term "waveguide" includes a signal-carrying core of an optical fiber as well as a waveguide formed in or on a slab or other substrate.

The inventors have observed that, in some embodiments, improved performance in a pulsed fiber laser can be obtained where the gain fiber contained a significant central dip in index of refraction; i.e., when the core has a central area of lower index of refraction as compared to the outer portions of the core. When seeded with a "Gaussian seed source" light signal, the PFLs (pulsed fiber lasers) using such a fiber gave more energy, better beam quality, and lower ASE (amplified stimulated emission) than otherwise-similar fibers with refractive index cross-sections closer to a step index. The improvement was apparent with an excitation condition in which the input beam was close to that of a fundamental Gaussian mode despite a fiber-mode profile for the fundamental mode which was donut like.

It is believed that the possible reasons for the improvement include one or more of the following.

(i) The central dip reduces the nonlinearity, enabling higher peak powers prior to pulse breakup. The inventors believe that the burnout could reduce the nonlinear index for a mode experiencing less phosphorous and more silica;

(ii) The dispersion or dispersion slope is affected by the profile or radial composition change, such that four-wave mixing (FWM) is reduced;

(iii) The central dip makes energy extraction in the wings more efficient;

(iv) There are lower scatter levels due to lower amounts of phosphorous in the center, which leads to lower backscatter, and therefore higher small-signal gain and energy;

(v) There are fewer modes as a result of reduced effective numerical aperture (NA), which leads to less amplified stimulated emission (ASE) and higher small-signal gain; and (vi) The Gaussian input beam excites predominantly an LP02-like mode of the structure. With this modal excitation, the central lobe experiences the silica central region more than other modes, while the secondary lobes experience the doped ions at the outer region of the core more than an LP01 mode would experience the outer ions in a step index fiber.

The present invention includes deliberately introducing the central dip such that some or all of the above are improved.

FIGS. 1A and 1B show equivalent step profiles between a fiber with dip according to the present invention and a conventional fiber having a step profile. In the case shown in FIG. 1A, the peak index difference is maintained and the diameter of the core is adjusted to give the same number of modes. In the case shown in FIG. 1B, the diameter of the core is maintained and the index difference is reduced to give the same number of modes. In some embodiments, the fiber of the present invention provides higher power capability as compared to a step fiber having the same number of modes.

FIG. 1A are schematic graphs 100 and 98 comparing the index of refraction across a diameter of a central-dip fiber according to the present invention to that of a conventional fiber having a step index of the same magnitude but having a smaller core diameter than that of the central-dip fiber. Schematic graphs 100 and 98 show the index of refraction (vertical axis) versus position across a diameter (horizontal axis) of fibers.

FIG. 1B are schematic graphs 100 and 99 (as an alternative to the comparison of FIG. 1A) comparing the index of refraction across a diameter of a fiber according to the present invention to that of a conventional fiber having a step index of smaller magnitude but having the same (larger) core diameter as that of the central-dip fiber. Schematic graphs 100 and 99 show the index of refraction (vertical axis) versus position across a diameter (horizontal axis) of fibers.

FIG. 1C is a schematic graph 110 of the index of refraction (vertical axis) across a diameter (horizontal axis) of a fiber according to the present invention that also has an outer cladding of a lower index of refraction. In some embodiments, the index of refraction follows this graphed profile, and no active doping species (such as erbium or ytterbium) is included. In other embodiments, one or more active doping species such as erbium and ytterbium are added using a similar central profile for the concentration of active species.

FIG. 1D is a schematic graph 120 of the index of refraction (vertical axis) across a diameter (horizontal axis) of a fiber according to the present invention with a core having a smaller central dip than the dip of the core of FIG. 1C.

FIG. 1E is a schematic graph 130 of the index of refraction (vertical axis) across a diameter (horizontal axis) of a fiber according to the present invention with a double step of lowered index towards the center of the core is provided as shown.

Figure 1F:
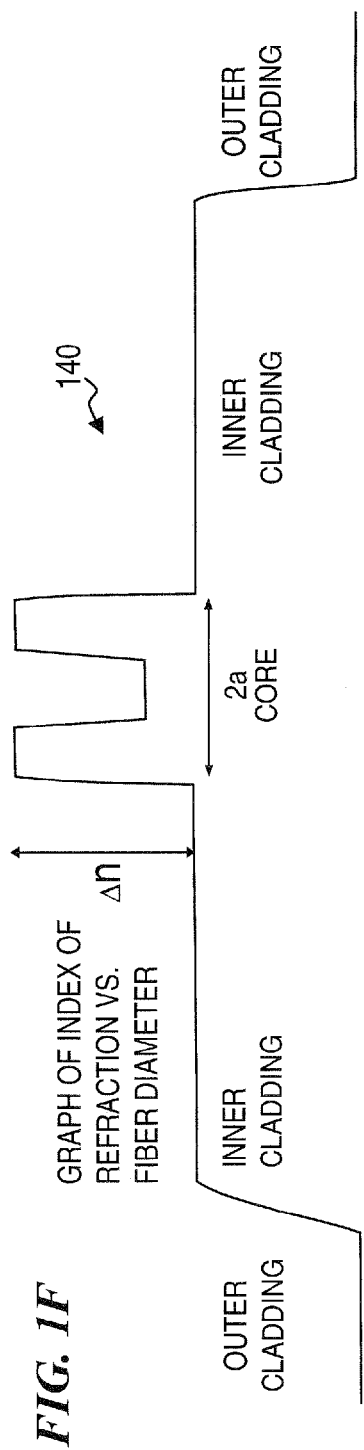
FIG. 1F is a schematic graph 140 of the index of refraction across a diameter of a fiber according to the present invention with a stepped central dip.

FIG. 1F is a schematic graph 140 of the index of refraction (vertical axis) across a diameter (horizontal axis) of a fiber according to the present invention with a stepped central dip. In some embodiments, a single step of lowered index towards the center of the core is provided as shown.

Figure 1G:
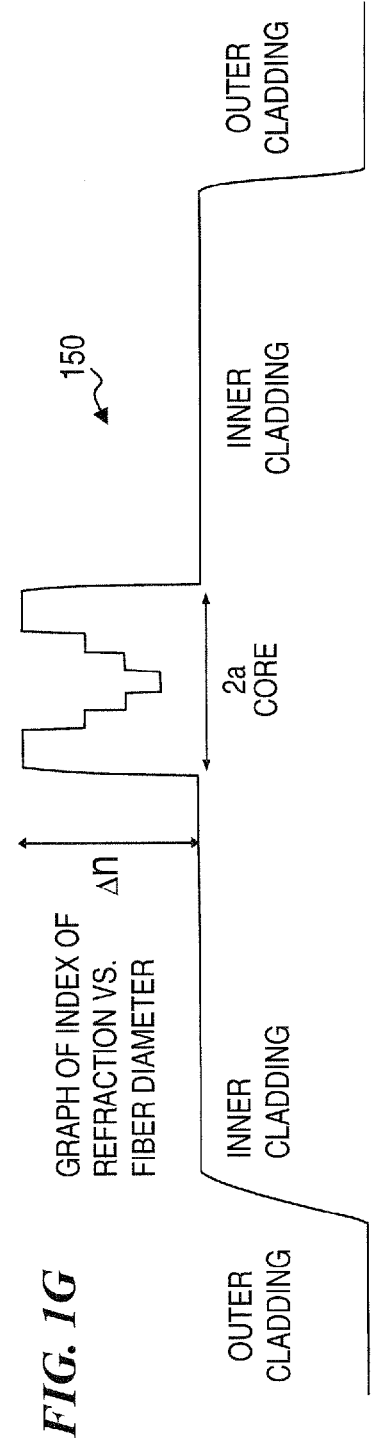
FIG. 1G is a schematic graph 150 of the index of refraction across a diameter of a fiber according to the present invention with a stepped central dip.

FIG. 1G is a schematic graph 150 of the index of refraction (vertical axis) across a diameter (horizontal axis) of a fiber according to the present invention with a stepped central dip. In some embodiments, a triple step of lowered index towards the center of the core is provided as shown.

FIG. 1H is a schematic graph 160 of the index of refraction (vertical axis) across a diameter (horizontal axis) of a fiber according to the present invention with a pedestal of raised index of refraction in the inner cladding adjacent to the core.

FIG. 1I is a schematic graph 170 of the index of refraction (vertical axis) across a diameter (horizontal axis) of a fiber according to the present invention with a pedestal of raised index of refraction in the inner cladding adjacent to the core. In this case the minimum in the index near the center of the core falls below the index of the pedestal in the inner cladding.

FIG. 2A is a perspective schematic diagram of an operation 201 in the making of a fiber according to the present invention. In some embodiments, inside chemical vapor deposition (ICVD) is used with process materials such as $SiCl_4$, $GeCl_4$, $POCl_3$, $BBr_3$, $BCl_3$, and the like (materials used to increase or set the index of refraction), which are oxidized in a burner (either an external flame or an internal RF-generated plasma) and deposited inside a rotating silica tube 210 as "soot" (see, e.g., Christopher C. Davis "Lasers and Electro-optics Fundamentals and Engineering" Chapter 17, Cambridge University Press, 1996). By varying the vapor being decomposed, layers of soot particles can be built up, layer upon layer, to generate a structure that when heated, collapsed and drawn into a fiber, will have the desired final fiber size, core size, and refractive index profile. In some embodiments, lasing species such as erbium and ytterbium materials are also deposited, in order to dope the areas of the core carrying the most signal light (those having increased index of refraction) with the highest concentration of lasing species.

FIG. 2B is a perspective schematic diagram of an operation 202 in the making of a fiber according to the present invention. In this operation, tube 210 is being rotated, heated and collapsed to form glass blank 212.

Figure 2D:
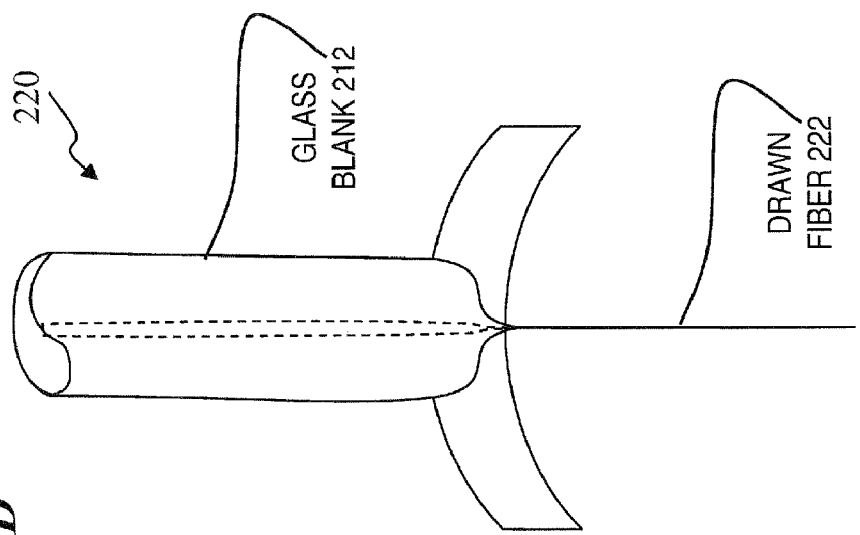
FIG. 2D is a perspective schematic diagram of an operation 220 in the making of a fiber according to the present invention.
Figure 2C:
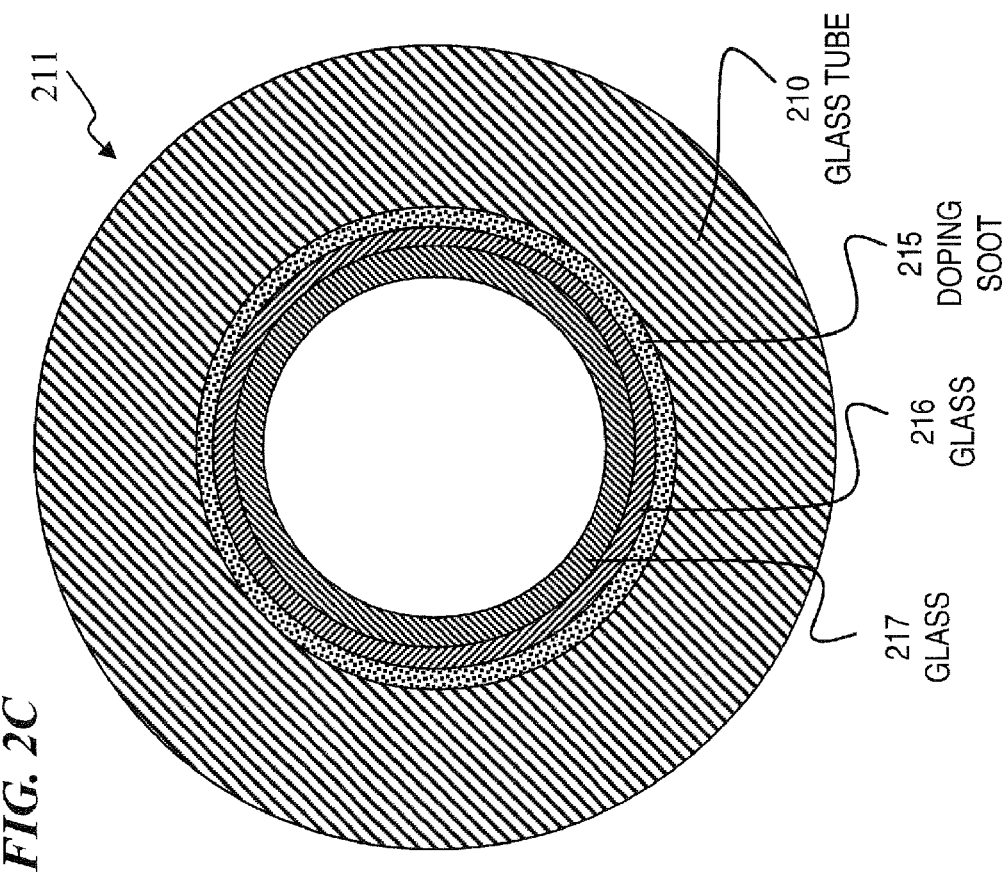
FIG. 2C is a cross-section schematic diagram of an intermediate structure 211 in the making of a fiber according to the present invention.

FIG. 2C is a cross-section schematic diagram of an intermediate structure 211 in the making of a fiber according to the present invention. In some embodiments, intermediate structure 211 includes a silica or glass tube 210, inside of which are deposited, successively or simultaneously, doping soot 215, and one or more layers of materials 216 and/or 217 that become glass (e.g., Si or Ge materials). In some embodiments, there are deposited one or more glass layers 216 (and optionally 217 and the like), each layer having an index profile that when collapsed and drawn into fiber, forms a core and fiber having the desired index-of-refraction profile. In some embodiments, one or more sintering operations are performed to fix in place the materials being deposited. As shown in FIG. 2B, this intermediate structure 211 is then heated and collapsed to form glass blank 212.

FIG. 2D is a perspective schematic diagram of an operation 220 in the making of a fiber according to the present invention. In some embodiments, glass blank 212 is heated within a furnace and a fiber 222 is drawn downward in a vertical direction, cooled, and then spooled or otherwise collected.

FIG. 3A is a perspective schematic diagram of an operation 301 in the making of a fiber according to the present invention. This operation is similar to that shown in FIG. 2A, except that in some embodiments, a glass rod 320 having one or more layers or a graded index profile is placed in the center of tube 310, and then one or more layers of "soot" are deposited on the inside surface of tube 310 and the outside surface of rod 320.

FIG. 3B is a perspective schematic diagram of an operation 302 in the making of a fiber according to the present invention. This operation is similar to that shown in FIG. 2B described above.

Figure 3D:
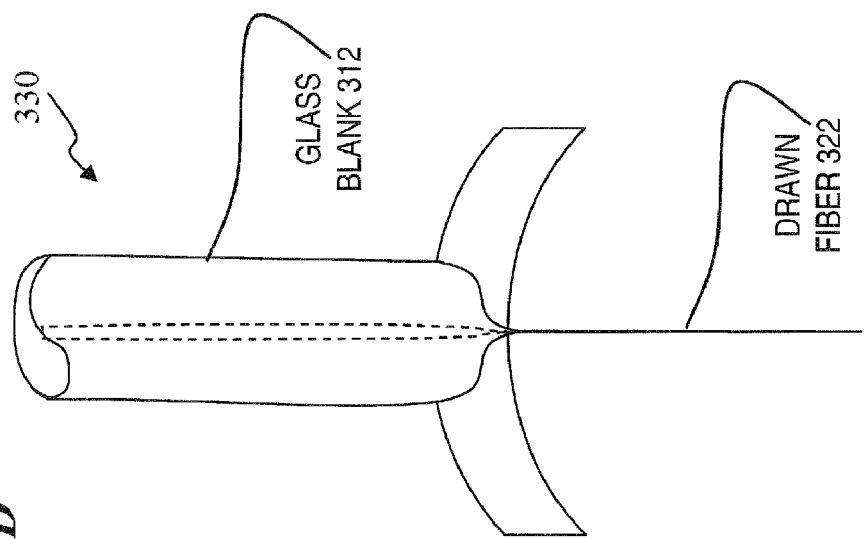
FIG. 3D is a perspective schematic diagram of an operation 320 in the making of a fiber according to the present invention.
Figure 3C:
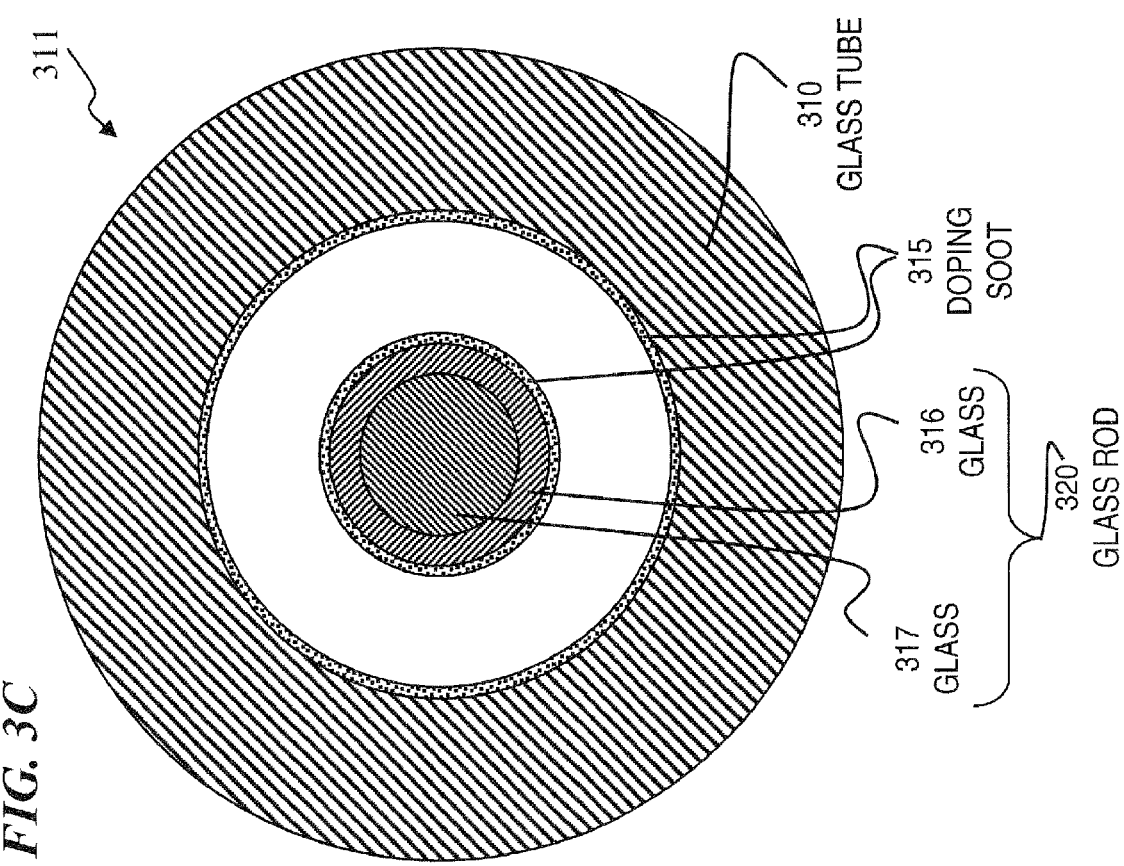
FIG. 3C is a cross-section schematic diagram of an intermediate structure 311 in the making of a fiber according to the present invention.

FIG. 3C is a cross-section schematic diagram of an intermediate structure 311 in the making of a fiber according to the present invention. In some embodiments, intermediate structure 311 includes a silica or glass tube 310, inside of which are deposited, successively or simultaneously, doping soot 315. Rod 320 has one or more layers 316 (and optionally 317 and the like) having an index profile that forms a core and fiber having the desired profile. In some embodiments, one or more sintering operations are performed to fix in place the materials being deposited. As shown in FIG. 3B, this intermediate structure 311 is then heated and collapsed to form glass blank 312.

FIG. 3D is a perspective schematic diagram of an operation 330 in the making of a fiber according to the present invention. This operation is similar to that shown in FIG. 2D described above.

FIG. 4A includes a schematic graph 110 of the index of refraction across a diameter 4A (e.g., along the cut lines 4A of a fiber 402 as shown in FIG. 4B or a slab substrate as shown in FIG. 4C) according to the present invention, wherein the device also has an outer cladding of a lower index of refraction. In some embodiments, the inner cladding is used to carry and inject pump light onto the core that has the central dip in index of refraction.

In some embodiments, such a fiber having a core with the central dip in the index of refraction is doped with a stimulated-emission species. In some such embodiments, the doping (stimulated-emission concentration) profile 411 of the core substantially matches the index-of-refraction profile of the core, in order that the pumped stimulated-emission species is more fully depleted by the primary mode (the active species is located where the light is). In some embodiments, the core is of a large diameter—a diameter so large that it would be a multimode fiber if the core had a step index-of-refraction profile, and the core supports a large mode area (LMA) optical signal. However, because of the central dip, the core supports a single LP02 mode and essentially becomes a single-mode LMA fiber. In other embodiments, the doping (stimulated-emission concentration) profile 412 of the core is substantially a step-profile.

In some embodiments, such a fiber having a core with the central dip index profile is not doped with a stimulated-emission species (i.e., the graph of the doping concentration is zero or substantially zero across the entire fiber), but such a fiber is spliced to another fiber or slab waveguide that has a core doped with a stimulated-emission species, in order that the fiber having a core with the central dip transforms an optical signal to have a mode profile that better matches the desired signal input to the core doped with a stimulated-emission species.

In some embodiments, the undoped fiber 520 (see FIG. 5) having a core with the central dip index-of-refraction profile (e.g., 110) is optically coupled to a fiber or slab having the active-species doping with a central-dip index-of-refraction profile such as 110 and a central-dip doping profile such as 411.

In other embodiments, the undoped fiber 520 having a core with the central dip index-of-refraction profile (e.g., 110) is optically coupled to a fiber or slab having the active-species doping with a central-dip index-of-refraction profile such as 110 and a step-doping profile such as 412.

In still other embodiments, the undoped fiber 520 having a core with the central dip index-of-refraction profile (e.g., 110) is optically coupled to a fiber or slab having the active-species doping with a step index-of-refraction profile (not separately shown, but similar in shape to step-doping profile 412) and a step-doping profile such as 412.

FIG. 4B is a perspective schematic diagram partially in cross-section of a device 402 having a core 425 with a central dip according to some embodiments of the present invention. In some embodiments, device 402 includes a fiber 420 having an outer cladding 422 of reduced index of refraction, an inner cladding 421 of moderate index of refraction (e.g., in some embodiments, this inner cladding 421 is used to carry pump light that is drawn into the core 425 due to its higher index), and a core 425 having a central dip indicated in the Figure by the lighter shading towards the center of the core. In some embodiments, the index profile 110 and doping profile 411 or 412 of FIG. 4A are across a diameter indicated by cut line 4A.

FIG. 4C is a perspective schematic diagram partially in cross-section of a central-dip-waveguide core within a larger slab, rod, or chip-type substrate waveguide optical device 403 according to some embodiments of the present invention. In some embodiments, device 403 includes a slab (or wafer) 430 having an outer cladding 432 (e.g., the base substrate) of reduced index of refraction, an inner cladding 431 of moderate index of refraction (e.g., in some embodiments, this inner cladding 431 is used to carry pump light that is drawn into the core 435 due to its higher index), and a core 435 having a central dip indicated in the Figure by the lighter shading towards the center of the core. In some embodiments, the index profile 110 and doping profile 411 or 412 of FIG. 4A are as would be measured across a horizontal line (or "diameter") across the waveguide as indicated by cut line 4A.

FIG. 5 is a perspective schematic diagram of a device 500 using components according to the present invention. In some embodiments, device 500 includes a source of a laser signal 510 (the light signal to be amplified). The laser signal is injected into the core or signal waveguide of device 520 using, e.g., lens 512. In some embodiments, undoped device 520 has a core with an index profile having a central dip, as described above, but is not doped with any active-species/stimulated emission doping. In some embodiments, the mode of the signal light is modified by undoped device 520, and that light is then transmitted into active device 530, which does have active-species/stimulated emission doping, wherein the modification of the signal mode intensity profile improves the amplification efficiency of the active device 530 by making the mode better match an optimized doping and energy-extraction profile, improving signal amplification in the primary mode (e.g., an LP02 mode). In some embodiments, active device 530 receives pump light from a pump laser 514 into its inner cladding layer, and the pump light then enters the core along its entire length. In some embodiments, the doping profile of active device 530 has a central dip (see profile 411 of FIG. 4A). In some embodiments, the doping profile of active device 530 has a step profile (see profile 412 of FIG. 4A). In some embodiments, transition device 520 is omitted and the signal light from source 510 is injected directly into active device 530 from lens 512, wherein active device 530 has an index profile with a central dip.

SIGNAL-BEAM-ABSORBING STRUCTURE IN THE CORE OF THE FIBER

Figure 6A:
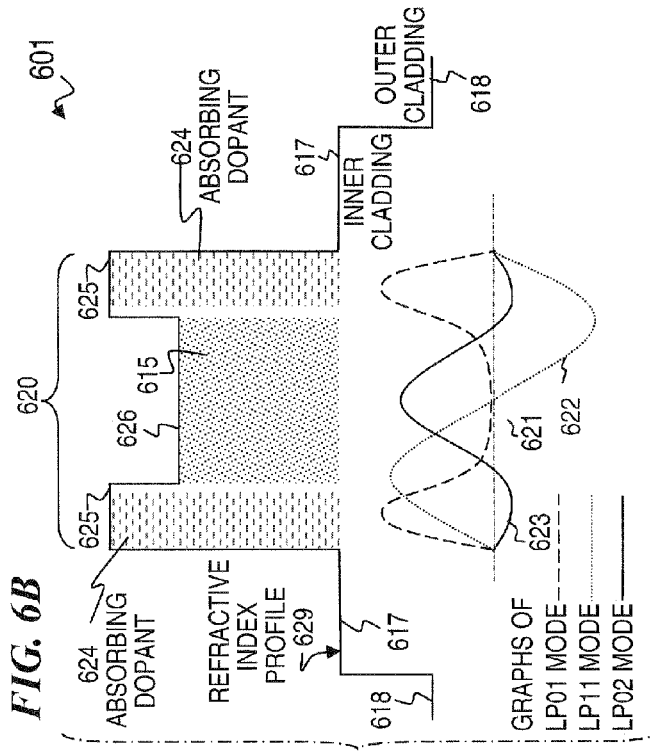
FIG. 6A is a schematic graph 600 showing the index of refraction profile across a diameter of a step-index-core fiber, along with the doping profile of the core and three linear-polarization modes of the signal in the core.

FIG. 6A is a schematic graph 600 showing the index-of-refraction profile 619 across a diameter of a step-index-core fiber, along with the active doping profile 615 of the core and the field amplitude-versus-radial distance curves (curve 611 for the LP01 mode, curve 612 for the LP11 mode, and curve 613 for the LP02 mode; in some embodiments, these curves represent the electric-field amplitude, and thus some show various zero crossings and negative-amplitude regions) for three of the linear-polarization modes of the signal in the core. In some embodiments, index-of-refraction profile 619 has a circularly symmetric core 610 having a having a step-type profile 616 of increased index of refraction, a circularly symmetric inner cladding 617 surrounding the core, and a circularly symmetric outer cladding 618 of lower index of refraction than the inner cladding 617. In such a gain fiber, it is very difficult to preferentially amplify the LP02 mode (i.e., without amplifying the LP01 mode as well, since any doping within the main portion of the LP02 curve is also within the main portion of the LP01 curve) of a signal beam that is injected from a Gaussian source. When both the LP01 and the LP02 modes are amplified, the beam quality suffers. The core in this case is doped with one or more active species (such as ErYb)

Figure 6B:
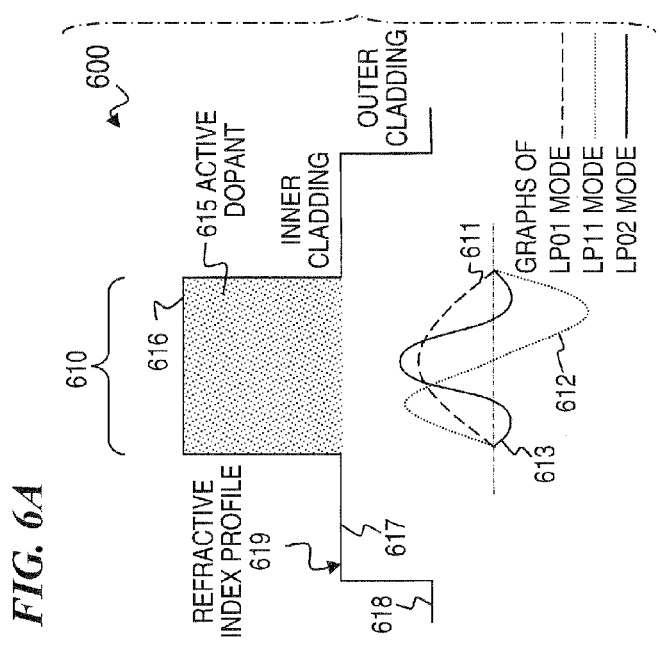
FIG. 6B is a schematic graph 601 showing the index of refraction profile across a diameter of a dip-index-core fiber having a signal-absorbing structure, along with the doping profile of the core and three linear-polarization modes of the signal in the core.

FIG. 6B is a schematic graph 601 showing the index-of-refraction profile across a diameter of a dip-index-core fiber. FIG. 6B represents a fiber having a central dip in the index of refraction in its core, and having a signal-absorbing structure 624 (in this case, a ring of absorbing dopant 624 within the circularly symmetric raised-index periphery 625 of the circularly symmetric core 620), along with the active doping profile 615 and absorbing doping profile 624 of the core 620 and the field amplitude-versus-radial distance curves for three linear-polarization modes (curve 621 for the LP01 mode, curve 622 for the LP11 mode, and curve 623 for the LP02 mode) of the signal in the core 620, according to some embodiments. In some embodiments, the circularly symmetric raised index of refraction 625 in the periphery of the core 620 changes the shape of the LP01-mode curve 621 such that across the center of the core, the LP01 mode curve 621 has a small magnitude while the LP01 mode curve 621 has a large magnitude coinciding with the raised index of refraction at the periphery of the core 620. In contrast, the LP02 curve substantially retains the shape it had in the step-index fiber of FIG. 6A. Accordingly, some embodiments include active (gain-type) doping in the center portion of the core and an absorbing (loss-type) doping in the periphery of the core. This provides preferential gain to the LP02 mode 623 and preferential loss to the LP01 mode 621. Thus the LP02-mode beam 623 experiences much higher gain than does the LP01 mode 621 or the other higher-order modes (not shown), resulting in better beam quality. In other embodiments, rather than an absorbing (loss-type) doping 624 in the periphery of the core 620, substantially no doping is placed there, providing little gain for the LP01 mode, while the gain doping in the central portion of the core provides gain for the LP02 mode (differentially enhancing he LP02 mode). These embodiments have an index-of-refraction dip or trench in the center of the core with a surrounding ring of higher index-of-refraction to define the core, which can enable the LP02 mode to be preferentially excited rather than the LP01 mode (with a Gaussian input signal beam launched into the core). In some embodiments, this provides a useful alternative to conventional designs that use fundamental mode excitation (i.e., gain to the LP01 mode) and/or to differential bend-loss for the residual excitation of higher-order modes. In some embodiments, the present invention uses the index-of-refraction profile to move the fundamental mode (LP01) to the periphery of the core where it receives little gain or incurs loss due to absorbing species. The LP02 mode is not the "fundamental mode" because it has a transverse zero in its field pattern.

In some embodiments, a simple LMA (large mode-area) fiber (e.g., with a mode field diameter of about 20 microns or more) could be used, wherein the core primarily supports three modes: the LP01, LP11 and LP02 linear-polarization modes. The mode profiles are shown schematically in FIG. 6A. If the fiber core is uniformly doped, then all three of these modes will experience gain with very little differential in the amount of gain each mode receives. While dopant confinement (e.g., confining gain dopant to the center of the core) can slightly enhance the gain for the LP01 mode relative to other modes, a penalty is paid in a double-clad amplifier because pump absorption is reduced in proportion to the confinement factor. However, when a higher-index ring is added around this core structure (forming a central dip), the mode profiles LP01, LP02 and LP11 are perturbed or changed as shown in FIG. 6B. The LP01 mode experiences a major change, wherein the LP01 mode has been moved out of the center of the core and into the ring, the LP11 mode has spread out but is qualitatively unchanged, and the LP02 mode is close to Gaussian with its secondary maximum in the ring but of much reduced amplitude. In some embodiments, the active dopant is maintained throughout the original core (now the trench in the profile, due to the higher-index ring), while adding a second species that absorbs at the signal wavelength to the ring can introduce a substantial further differential gain advantage for the LP02 mode, which is now, in some embodiments, also a mode with low $M^2$ quality factor or value.

In some embodiments, the adding of the higher-index ring 625 means that the structure 620 may now support additional higher-order modes but, in some embodiments, these modes have a higher overlap with the ring (which, in some embodiments, includes absorbing dopant) than the LP02 mode and therefore also experience less gain or more loss than the LP02 mode.

The structure shown in FIG. 6B, provides the improved power capability that results from using a large mode-area (LMA) core (which would otherwise normally support multiple modes and result in poor beam quality), and also preferentially amplifies one mode (the LP02 mode). This provides advantages over U.S. Pat. No. 5,818,630 to Fermann et al. (which is hereby incorporated by reference), by operating on the LP02 mode (i.e., preferentially amplifying the LP02 mode rather than the fundamental LP01 mode), while also bringing advantages over U.S. Pat. No. 6,496,301 to Koplow et al. (which is hereby incorporated by reference), in that unlike Koplow et al, a differential loss of one mode over other modes is built into the design without bending. In some embodiments, the present invention provides also provides advantages over U.S. Pat. No. 6,327,403 and No. 6,434,311, both to Danzinger et al. (which are both hereby incorporated by reference), in that differential amplification of the desired mode is provided. These advantages in turn allow for higher NA's, allowing greater compositional freedom than in conventional LMA amplifying fibers.

Figure 6C:
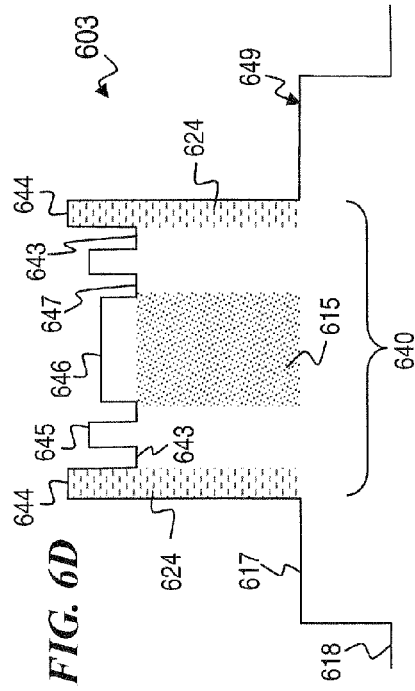
FIG. 6C is a schematic graph 602 showing the index of refraction profile across a diameter of a trench-index-core fiber having a signal-absorbing structure, along with the doping profile of the core.

FIG. 6C is a schematic graph 602 showing the index-of-refraction profile across a diameter of a trench-index-core fiber having a signal-absorbing structure, along with the doping profile 639 of the core 630. In some embodiments, this fiber has a raised-index outer ring 635, surrounding a trench of lower-index material 637, which in turn surrounds a central core portion 636 having a lower index than the outer ring 635 but a higher index than trench 637. In some embodiments, this arrangement provides an improved preferential gain to a single non-fundamental mode (e.g., the LP02 mode, in some embodiments). In some embodiments, the active doping (the gain region of the fiber) coincides primarily with the desired mode (e.g., LP02) and not with undesired modes (e.g., LP01 and other modes), while the absorbing structure 624 (the portion doped with laser species (e.g., rare-earth dopants) that absorb the signal wavelength, and, in some embodiments, do not absorb the pump wavelength).

Figure 6D:
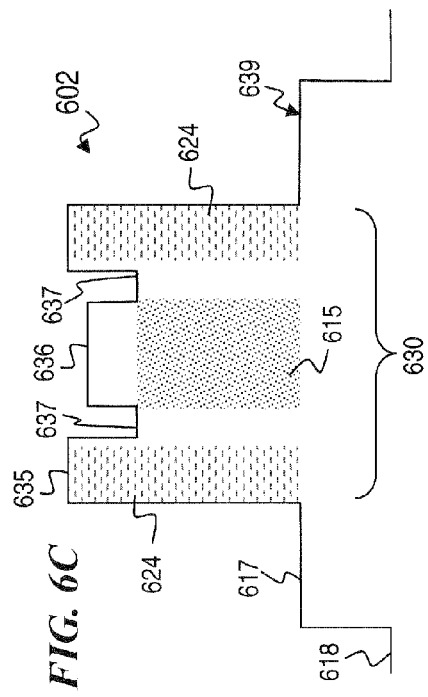
FIG. 6D is a schematic graph 603 showing the index of refraction profile across a diameter of a multi-ring-index-core fiber having a signal-absorbing structure, along with the doping profile of the core.

FIG. 6D is a schematic graph 603 showing the index-of-refraction profile 649 across a diameter of a multi-ring-index-core fiber having a signal-absorbing structure 624, along with the doping profile 649 of the core 640. In some embodiments, this fiber has a plurality of raised-index rings: a raised-index outer ring 644 surrounding an outer trench 643, another raised-index inner ring 645, surrounding a trench 647 of lower-index material, which in turn surrounds a central core portion 646 having a lower index than the inner ring 645 or outer ring 644 but a higher index than trenches 643 and 647. In some embodiments, this arrangement provides an improved preferential gain to a single non-fundamental mode (e.g., the LP02 mode, in some embodiments). In some embodiments, the active doping 615 (the gain region of the fiber) coincides primarily with the desired mode (e.g., LP02) and not with undesired modes (e.g., LP01 and other modes), while the absorbing structure 624 (the portion doped with laser species (e.g., rare-earth dopants) that absorb the signal wavelength, and, in some embodiments, do not absorb the pump wavelength).

FIG. 6E is a schematic graph 604 showing the index-of-refraction profile 120 (similar to that of Figure 1D described above) across a diameter of a fiber without an index pedestal in the inner cladding. The ring at the periphery of the core has an index raised by an amount $\Delta n_2$ relative to the inner cladding, and a central core dip whose index is lowered relative to the ring by an amount $\Delta n_1$, and the core has a diameter of 2a. At the bottom. also shown is a graph 651 showing the shape of the LP01 mode. In this case, the LP01 mode has a pronounced intensity dip in the center of the profile.

FIG. 6F is a schematic graph 605 showing the index-of-refraction profile 160 (similar to that of FIG. 1H described above) across a diameter of a fiber with an index pedestal in the inner cladding. In this case the index dip at the center of the core is relatively shallow compared with the height of the pedestal. The ring at the periphery of the core has an index raised by an amount $\Delta n_2$ relative to the pedestal, which in turn has an index raised by an amount $\Delta n_3$ relative to the inner cladding, and the core has a central core dip whose index is lowered relative to the ring by an amount $\Delta n_1$ relative to the ring at the periphery of the core, and the core has a diameter of 2a. At the bottom. also shown is a graph 661 showing the shape of the resulting LP01 mode with a reduced intensity dip in the center of its profile.

FIG. 6G is a schematic graph 606 showing the index-of-refraction profile 170 (similar to that of FIG. 1I described above) across a diameter of a fiber with an index pedestal in the inner cladding. In this case the index dip at the center of the core is relatively deep, with an excursion below the top of the pedestal surrounding the core (the ring at the periphery of the core has an index raised by an amount $\Delta n_2$ relative to the pedestal, which in turn has an index raised by an amount $\Delta n_3$ relative to the inner cladding, and the core has a central core dip whose index is lowered relative to the ring by an amount $\Delta n_1$ relative to the ring at the periphery of the core, and the core has a diameter of 2a. At the bottom. also shown is a graph 671 showing the shape of the resulting LP01 mode). However, here the pedestal is at a higher refractive index relative to the central dip, resulting in an LP01 mode with a minimal intensity dip in the center of its profile, resembling a Gaussian shape. With this structure, a truly mathematically single-mode operation can be achieved for a larger core diameter, as compared to a fiber having a pedestal structure in the inner cladding, but in which the central dip in the core is absent. In some embodiments, the pedestal has absorbing material in order to tailor the beam shape and reduce noise. In some embodiments, a large $\Delta n_3$ of the pedestal is implemented to decrease the number of modes in the core. In some embodiments, a larger dip $\Delta n_1$ is implemented to decrease the number of modes in the core. In some embodiments, both a larger $\Delta n_1$ and a larger $\Delta n_3$ are implemented to decrease the number of modes in the core.

In some embodiments, the present invention provides a multimode optical fiber with a transverse variance in refractive-index profile such that a particular mode ("the amplified mode") experiences a certain gain under optical pumping, while all other modes experience either loss or a gain ($g_0$) of less than about ninety percent (90%) of the gain of the amplified mode. Note that because fiber amplifiers operate at such high gain values, the total gain of an amplifier G=exp ($g_0$1) can be very high, and so small changes in $g_0$ can make very large differences. It therefore does not take much difference in gain to strongly discriminate between modes.

In some embodiments, the present invention provides a fiber amplifier (in some embodiments, this is a pulsed optical amplifier, while in other embodiments, it is a CW (continuous-wave) amplifier), in which a multimode-type doped core contains a central dip or one or more trenches in the refractive index profile.

In some embodiments, the fiber amplifier includes a co-doping of erbium and ytterbium (an ErYb co-doped fiber).

In some embodiments of the fiber amplifier, the amplifying medium includes doping of one or more species selected from the group consisting of Er, Yb, Tm, Nd, Ho, Pr, and Sm. In other embodiments, one or more others of the rare-earth elements are used as appropriate to the wavelengths that are desired.

In some embodiments of the fiber amplifier, an input signal is launched substantially into at least two modes of the multimode-core structure. In some embodiments, the two modes are as defined by the index-of-refraction profile rather than by gain or loss dopant species.

In some embodiments of the fiber amplifier, the fiber is excited by a Gaussian beam. In some such embodiments, the Gaussian input beam substantially excites two or more modes of said multimode fiber. In some embodiments, the substantially excited modes are the LP01 and LP02 modes. In some embodiments, the LP01 mode has significantly more gain than the LP02 mode. In some embodiments, the LP01 mode has negligible field amplitude on the fiber axis. In some such embodiments, an absorbing material is doped along the fiber axis so as to provide differential attenuation to the LP02 mode. In some embodiments, the absorbing dopant is thulium.

In some embodiments, the doping of rare-earth gain species is negligible on the fiber axis and maximum at the peak of the ring index-of-refraction profile.

In some embodiments, the spotsize of the Gaussian beam is configured to provide maximum excitation of the LP01 mode.

In some embodiments, an index pedestal in the inner cladding surrounding the core is provided, improving the beam quality parameter $M^2$ of the LP01 mode by reducing its central intensity minimum.

In some embodiments the raised index of the pedestal and the central index dip together result in a core structure which is a mathematically single-mode.

In some embodiments of the fiber amplifier, the LP02 mode has significantly more gain than the LP01 mode.

In some embodiments of the fiber amplifier, one or more active rare earth species are doped in the region of the profile corresponding to the dip in index of refraction.

In some embodiments of the fiber amplifier, an absorbing species is doped into the ring structure (i.e., the ring structure being the annular region of higher index of refraction in the outer portion of the core that surrounds the central core that has the major portion of the mode of interest and/or the active species used for amplification). As used herein, the term "active dopant" is the same as "stimulated-emission species," also called a "lasing species," and these function (alone or in combination with other materials) to absorb pump energy (typically light of a shorter wavelength) and to provide stimulated emission amplification of a signal wavelength (typically a longer wavelength). A stimulated-emission species is typically a rare-earth element used as a dopant in a transparent material such as glass. As used herein, a waveguide is any structure that confines light to propagate along its length (e.g., a core of a optical fiber that confines signal light, or an inner cladding of an optical fiber that confines pump light to propagate along the core, or a waveguide on a planar substrate), by any suitable mechanism such as increased index of refraction compared to the surrounding material, or photonic-crystal structures as are well known in the art.

In the following claims, the term "corresponding step profile" is defined as a step profile with equivalent peak index-of-refraction difference relative to an inner cladding and a diameter scaled to support the same number of modes as the fiber with the actual dip or trench profile. This is illustrated in FIG. 1A.

In the following claims, the term "equivalent step profile fiber" is defined as a fiber in which the diameter of the central-dip profile is the same as the step-index profile but the numerical aperture (and/or the amount of change of index-of-refraction) is adjusted (typically reduced) until the step-index profile provides the same number of modes as the central-dip profile. In this case, the advantage is related to the rare-earth dopants "following" the profile so that the local composition enables strong Yb—Er energy transfer. This is indicated in FIGS. 1B and 4A.

In some embodiments, the present invention provides an apparatus that includes an optical device configured to operate in a band of wavelengths from about 1500 nm to about 1700 nm, wherein the device includes a multimode signal waveguide having a central dip in the refractive index profile, the central-dip signal waveguide having a characteristic diameter.

In some embodiments, the optical device includes a fiber, and the signal waveguide is a core of the fiber that includes a doping of active stimulated-emission species, and the apparatus further includes a source of optical pump radiation suitable to pump the active stimulated-emission species to an excited state.

In some embodiments, the core includes a co-doping of erbium and ytterbium (an ErYb co-doped fiber).

In some embodiments, the fiber, when excited by a Gaussian beam, preferentially excites an LP02-like mode of the core.

In some embodiments, the fiber is configured such that the LP02-like mode experiences a lower effective nonlinear index than it would in a substantially similar fiber having a corresponding step profile.

In some embodiments, the LP02-like mode experiences a higher dispersion slope than in a substantially similar fiber having a corresponding step profile.

In some embodiments, an effective area of the mode divided by the number of propagating modes is enhanced relative to a corresponding step profile.

In some embodiments, an LP02-like mode of the fiber has a stronger overlap with ions of the active stimulated-emission species located in the wings (i.e., the one or more rings of higher index of refraction in the periphery of the core) of the profile relative to the overlap of an LP01 mode in a fiber having a corresponding step profile.

In some embodiments, an LP02-like mode of the fiber experiences less backscatter losses than the LP01 mode of a corresponding step profile.

In some embodiments, an energy transfer from Yb to Er in the fiber having the central-dip core is greater than an energy transfer from Yb to Er in a fiber having a step-index-of-refraction core having an "equivalent step profile" in which the diameter of the core of the step-index-of-refraction profile has the same characteristic diameter as the central-dip core but where the numerical aperture of the step-index-of-refraction core is lowered by an amount that provides the step-index core with the same number of modes as the central-dip core.

In some embodiments, an advantage related to the rare-earth dopants "following" the index-of-refraction profile enables stronger Yb—Er energy transfer.

In some embodiments, the device includes no doping of active doping species (such as erbium or ytterbium).

In some embodiments, the present invention provides an apparatus that includes a fiber amplifier operating in a band of wavelengths from about 1532 nm to about 1620 nm, in which a multimode, doped core contains a central dip in the refractive index profile.

In some embodiments, the fiber includes a co-doping of erbium and ytterbium (an ErYb co-doped fiber).

In some embodiments, the fiber is excited by a Gaussian beam that preferentially excites an LP02-like mode of the core.

In some embodiments, the mode experiences a lower effective nonlinear index than it would in a substantially similar fiber having a corresponding step profile.

In some embodiments, the mode experiences a higher dispersion slope than a corresponding step profile.

In some embodiments, the effective area of the mode divided by the number of propagating modes is enhanced relative to a corresponding step profile.

In some embodiments, an LP02-like mode of the fiber has a stronger overlap with the ions located in the wings of the profile relative to the overlap of the LP01 mode of a corresponding step profile.

In some embodiments, an LP02-like mode of the fiber experiences less backscatter losses than the LP01 mode of a corresponding step profile.

In some embodiments, an energy transfer from Yb to Er is greater than that for a step-index fiber having an "equivalent step profile" wherein the profile with a dip is compared to an "equivalent step profile fiber" in which the diameter of the profile is maintained, but the numerical aperture is reduced until the profile of the "equivalent step profile fiber" provides an equal number of modes as the actual profile, such that the advantage related to the rare-earth dopants "following" the profile so that the local composition enables strong Yb—Er energy transfer.

In some embodiments, the fiber includes substantially no doping of active doping species (such as erbium or ytterbium).

In some embodiments, the fiber includes Er doping, which produces lasing and/or amplifying in the 1500 nm range (e.g., about 1500 nm to about 1700 nm). In other embodiments, the invention uses fibers doped solely with Yb, thus lasing and/or amplifying in the 1.0 micron range (e.g., about 1020 nm to about 1100 nm), when those wavelengths are also of interest.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   an optical device configured to operate in a band of wavelengths corresponding to a gain band of one or more active rare-earth species, wherein the device includes a multimode signal waveguide having a central dip in the refractive index profile, the signal waveguide having a characteristic diameter, the signal waveguide being surrounded by an adjacent pedestal region having an index of refraction that is lower than a peak index of refraction of the signal waveguide, the pedestal region being surrounded by an adjacent inner cladding, wherein the inner cladding has an index of refraction value that is lower than the index of refraction of the pedestal region, the inner cladding being surrounded by an adjacent outer cladding, wherein the index of refraction drops from the value at the inner cladding to a lower value at the outer cladding.

2. The apparatus of claim 1, wherein the optical device is a fiber, and the signal waveguide is a core of the fiber that includes a doping of active stimulated-emission species, the apparatus further comprising:
   a source of optical pump radiation suitable to pump the active stimulated-emission species to an excited state.

3. The apparatus of claim 2, wherein the core includes a co-doping of erbium and ytterbium (an ErYb co-doped fiber).

4. The apparatus of claim 3, wherein an energy transfer from Yb to Er in the fiber having the central-dip core is greater than an energy transfer from Yb to Er in a fiber having a step-index-of-refraction core having an "equivalent step profile" in which the diameter of the core of the step-index-of-refraction profile has the same characteristic diameter as the central-dip core but where the numerical aperture of the step-index-of refraction core is lowered by an amount that provides the step-index core with the same number of modes as the central-dip core.

5. The apparatus of claim 4, wherein a concentration of the erbium and ytterbium active-species dopants is proportional to an index-of-refraction profile of the central-dip core.

6. The apparatus of claim 2, wherein the fiber, when excited by a Gaussian beam, preferentially excites an LP02-like mode of the core.

7. The apparatus of claim 6, wherein the fiber is configured such that the LP02-like mode experiences a lower effective nonlinear index than it would in a fiber having a corresponding step profile, and wherein the corresponding step profile is a step profile with equivalent peak index-of-refraction difference relative to an inner cladding and a diameter scaled to support a same number of modes as the fiber having the central-dip profile.

8. The apparatus of claim 6, wherein the LP02-like mode experiences a higher dispersion slope than in a fiber having a corresponding step profile, and wherein the corresponding step profile is a step profile with equivalent peak index-of-refraction difference relative to an inner cladding and a diameter scaled to support a same number of modes as the fiber having the central-dip profile.

9. The apparatus of claim 6, wherein an effective area of the mode divided by the number of propagating modes is enhanced relative to a corresponding step profile, and wherein the corresponding step profile is a step profile with equivalent peak index-of-refraction difference relative to an inner cladding and a diameter scaled to support a same number of modes as the fiber having the central-dip profile.

10. The apparatus of claim 6, wherein an LP02-like mode of the fiber has a stronger overlap with ions of the active stimulated-emission species located in the wings of the profile relative to the overlap of an LP01 mode in a fiber having a corresponding step profile, and wherein the corresponding step profile is a step profile with equivalent peak index-of-refraction difference relative to an inner cladding and a diameter scaled to support a same number of modes as the fiber having the central-dip profile.

11. The apparatus of claim 6, wherein an LP02-like mode of the fiber experiences less backscatter losses than the LP01 mode of a corresponding step profile, and wherein the corresponding step profile is a step profile with equivalent peak index-of-refraction difference relative to an inner cladding and a diameter scaled to support a same number of modes as the fiber having the central-dip profile.

12. The apparatus of claim 2, wherein the fiber includes no doping of active doping species.

13. The apparatus of claim 2, wherein the fiber core includes doping of one or more species selected from the group consisting of Er and Yb.

14. The apparatus of claim 2, wherein the fiber core includes Er doping that amplifies in a wavelength range of about 1500 nm to about 1700 nm.

15. The apparatus of claim 2, wherein the fiber core includes substantially only Yb doping that amplifies in the wavelength range of about 1020 nm to about 1100 nm.

16. The apparatus of claim 2, wherein the fiber core includes doping of one or more species selected from the group consisting of Tm and Nd.

17. The apparatus of claim 2, wherein the fiber core includes doping of one or more species selected from the group consisting of Ho, Pr, and Sm.

18. The apparatus of claim 1, wherein the device includes no doping of active doping species.

19. The apparatus of claim 1, wherein the device includes no erbium doping.

20. The apparatus of claim 1, wherein the device includes no ytterbium doping.

21. An apparatus comprising:
   an optical device configured to operate in a band of wavelengths corresponding to a gain band of one or more active rare-earth species, wherein the device includes a multimode signal waveguide having a central dip in the refractive index profile, the signal waveguide having a characteristic diameter, the signal waveguide being surrounded by an adjacent index pedestal having an index of refraction that is lower than a peak index of refraction of the signal waveguide and higher than an inner cladding region, wherein the inner cladding is adjacent to and surrounding the index pedestal.

22. The apparatus of claim 21, wherein an LP01 mode produced by the fiber has a reduced central intensity dip compared with that produced by a fiber without the index pedestal.

23. The apparatus of claim 22, wherein the LP01 mode is approximately Gaussian.

24. The apparatus of claim 21, wherein the core of the fiber is mathematically single-moded.

25. A pulsed fiber amplifier, in which a multimode doped core of a gain fiber contains a central dip in the refractive index profile, the doped core being surrounded by an adjacent pedestal region having an index of refraction that is lower than a peak index of refraction of the doped core, the pedestal region being surrounded by an adjacent inner cladding, wherein the inner cladding has an index of refraction value that is lower than the index of refraction of the pedestal region, the inner cladding being surrounded by an adjacent outer cladding, wherein the index of refraction drops from the value at the inner cladding to a lower value at the outer cladding.

26. The fiber amplifier of claim 25, wherein the fiber includes a co-doping of erbium and ytterbium (an ErYb co-doped fiber).

27. The fiber amplifier of claim 26, wherein the fiber is excited by a Gaussian beam that preferentially excites an LP02-like mode of the core.

28. The fiber amplifier of claim 27, wherein the mode experiences a lower effective nonlinear index than it would in a fiber having a corresponding step profile, and wherein the corresponding step profile is a step profile with equivalent peak index-of-refraction difference relative to an inner cladding and a diameter scaled to support a same number of modes as the fiber having the central-dip profile.

29. The fiber amplifier of claim 27, wherein the mode experiences a higher dispersion slope than a corresponding step profile, and wherein the corresponding step profile is a step profile with equivalent peak index-of-refraction difference relative to an inner cladding and a diameter scaled to support a same number of modes as the fiber having the central-dip profile.

30. The fiber amplifier of claim 27, wherein the effective area of the mode divided by the number of propagating modes is enhanced relative to a corresponding step profile, and wherein the corresponding step profile is a step profile with equivalent peak index-of-refraction difference relative to an inner cladding and a diameter scaled to support a same number of modes as the fiber having the central-dip profile.

31. The fiber amplifier of claim 27, wherein an LP02 mode of the fiber has a stronger overlap with the ions located in the wings of the profile relative to the overlap of the LP01 mode of a corresponding step profile, and wherein the corresponding step profile is a step profile with equivalent peak index-of-refraction difference relative to an inner cladding and a diameter scaled to support a same number of modes as the fiber having the central-dip profile.

32. The fiber amplifier of claim 27, wherein an LP02-like mode of the fiber experiences less backscatter losses than the LP01 mode of a corresponding step profile, and wherein the corresponding step profile is a step profile with equivalent peak index-of-refraction difference relative to an inner cladding and a diameter scaled to support a same number of modes as the fiber having the central-dip profile.

33. The fiber amplifier of claim 25, wherein an energy transfer from Yb to Er is greater than that for a step-index fiber having an "equivalent step profile" wherein the profile with a dip is compared to an "equivalent step profile fiber" in which the diameter of the profile is maintained, but the numerical aperture is reduced until the profile of the "equivalent step profile fiber" provides an equal number of modes as the actual profile, such that the advantage related to the rare-earth dopants "following" the profile so that the local composition enables strong Yb—Er energy transfer.

34. The fiber amplifier of claim 25, wherein the amplifier operates in a band of wavelengths from about 1532 nm to about 1620 nm.

* * * * *